3,649,681
METHOD OF PREPARING AROMATIC
CARBOXYLIC ACIDS
Byron E. Johnston, Edison, and Peter R. Taussig, Mountainside, N.J., assignors to Mobil Oil Corporation
No Drawing. Filed Sept. 30, 1968, Ser. No. 763,943
Int. Cl. C07c 63/02
U.S. Cl. 260—524 R    8 Claims

ABSTRACT OF THE DISCLOSURE

The catalytic oxidation with oxygen of p-xylene or other methyl-substituted aromatic compounds to terephthalic acid, etc. in a reaction solvent (e.g., acetic acid) containing a dissolved oxidation catalyst (e.g., cobalt acetate) is promoted or activated by incorporating certain benzylic compounds (e.g., p-xylene diacetate) to provide a higher yield of a more pure product. Methyl ethyl ketone and other methylenic ketones may be employed in conjunction with the benzylic activator. Activation with a benzylic compound having —$CH_2$— nuclear substituents corresponding in number and orientation with the methyl substituents on the methyl benzene reactant further increases the yield by the substantial oxidation of such an activator to the desired aromatic carboxylic acid.

BACKGROUND OF THE INVENTION

Field of the invention

This invention relates to the catalytic oxidation with an oxygen-containing gas of alkyl aromatic compounds in the liquid phase to form monocarboxylic or polycarboxylic aromatic acids.

Prior art

Numerous proposals have been made for the production of aromatic carboxylic acids by the catalytic oxidation of alkylated benzenes in the liquid phase in the presence or absence of a solvent by means of air or oxygen using various metals or salts thereof as catalysts. In general, such methods have a number of disadvantages, such as, low degrees of conversion of the charge even after lengthy reaction periods; the simultaneous formation of other oxidation products that must be removed in additional processing steps; undesirably drastic reaction conditions or the use of additional reagents with an attendant increase in production costs. Where the desired product was a dibasic acid, the procedure generally involved successive steps, as exemplified by the conversion of a xylene to toluic acid followed by the oxidation of the latter in a more drastic reaction to the corresponding phthalic acid. To overcome such difficulties, a number of classes of organic compounds, such as peroxides, aldehydes and ketones have been recommended as reaction initiators, promoters or activators for these catalytic reactions. For example, 2-butanol is the activator in the process of the Chibnik Pat. No. 3,284,493 and acetaldehyde in the method described in Thompson et al. Pat. No. 3,240,803. In the cobalt-catalyzed oxidation of p-xylene in a single stage in acetic acid as the reaction solvent, according to the procedures set forth in Brill Pat. No. 2,853,514 and Ardis et al. Pat. No. 3,036,122, methyl ethyl ketone has been employed with considerable success in promoting the reaction; however, this ketone is converted in the reaction into acetic acid which is a desirable by-product already present in the reaction mixture but far less valuable than the terephthalic acid product.

There is a heavy demand for terephthalic acid of sufficiently high purity for direct esterification with ethylene glycol in producing polyethylene terephthalate for use in such articles as films, magnetic tapes and textile fibers. The major impurities present in terephthalic acid prepared by the catalytic oxidation of p-xylene result from incomplete oxidation. A particularly undesirable by-product of this type is paracarboxybenzaldehyde which acts as a chain stopper during polyesterification of the terephthalic acid and which, either alone or together with other by-products of the oxidation process, imparts undesirable properties to the resulting polyesters. Various techniques have been developed for purifying the crude acid, including a treatment of the vaporized acid with hydrogen at high temperatures in the presence of a suitable hydrogenation catalyst (e.g., palladium) to produce a sublimate of very high purity. However, even then, it is usually important to keep the p-carboxybenzaldehyde content of the crude acid as low as possible in order to minimize the consumption of the catalyst in the catalytic hydrogenation treatment, particularly when using an expensive noble metal catalyst.

SUMMARY OF THE INVENTION

The present invention concerns a process for the catalytic oxidation with molecular oxygen of an alkyl aromatic compound having at least one oxidizable methyl substituent in a liquid reaction mixture containing a dissolved heavy metal compound as the oxidation catalyst to produce an aromatic carboxylic acid in which the improvement comprises activating the oxidation reaction mixture by incorporating a benzylic compound having at least one nuclear substituent of the type:

—$CH_2OR$ wherein R represents hydrogen, an acyl radical containing at least two carbon atoms, or an alkyl, cycloalkyl or aryl radical.

Narrower aspects of the invention relate to one or more of such features as the addition of a methylenic ketone (preferably methyl ethyl ketone) to said reaction mixture; utilizing a lower aliphatic monocarboxylic acid as a liquid reaction medium, preferably an acid containing from two to four carbon atoms; a cobalt compound as the preferred catalyst; selecting a benzylic compound in which the number and orientation of its nuclear substituents correspond to the number of orientation of methyl substituents in said alkyl aromatic compound and/or said benzylic compound has substituents wherein R in the aforesaid formula represents an acyl radical containing from 2 to 4 carbon atoms; xylenes, especially p-xylene, as the preferred alkyl aromatic reactants subjected to oxidation; p-xylylene diacetate as the preferred activator for oxidizing p-xylene, and specified proportions of both the benzylic activator and the ketone activator.

Still other features of the invention as well as its objects and advantages will be apparent to those skilled in the art upon consideration of the disclosure hereinafter.

DESCRIPTION OF SPECIFIC EMBODIMENTS OF THE INVENTION

The instant invention is based on the discovery that improvements in product purity and yield are obtainable by the inclusion of certain benzylic compounds as activators or promoters in the conversion of methyl-substituted aromatic compounds into the corresponding aromatic carboxylic acids by the oxidation with gaseous oxygen of a liquid phase reaction mixture containing an oxidation catalyst in the form of a dissolved heavy metal compound; and it also encompasses the finding that known ketone activators display a considerably more pronounced activating effect when employed in conjunction with a benzylic compound than when the ketone is used as the sole activator.

Benzylic compounds suitable for the present process contain one or more —CH₂OR substituents attached to the aromatic nucleus with R designating hydrogen, acyl radicals having at least two carbon atoms, or an alkyl, cycloalkyl or aryl radical. Thus the benzylic compound may be an alcohol, ester or ether. The preferred promotors are benzylic esters, especially those derived from aliphatic monocarboxylic acids containing from 2 to 4 carbon atoms such as acetic, propionic and butyric acids as well as the isomers of the latter two. In instances where a low fatty acid, such as acetic acid, is present as a reaction solvent, it is often desirable to utilize a benzylic acetate as the activating compound because it is believed that the acetate radical or radicals of the latter compound are split off during the reaction to form more acetic acid, which is generally preferable to forming another acid or other extraneous byproduct in the reaction mixture. However, benzylic esters of other aromatic or longer chain aliphatic acids, as exemplified by benzyl toluate, benzyl octanoate and p-xylylene dibenzoate, may be employed provided that they are soluble or miscible in the reaction mixture.

In view of the oxidation of some of the activating agents in these reactions to carboxylic acids, it is often desirable to select a benzylic compound with nuclear substituents corresponding in number and orientation or position to the nuclear methyl substituents in the reactant being oxidized in order to enhance the yield of the desired product. For instance, the oxidation of meta-xylene is desirably promoted by m-xylylene diacetate or m-xylylene glycol and toluene oxidation may be promoted by benzyl propionate. In employing an activator in the form of a benzyl ester having a methyl substituent on the benzene ring, there are indications that this methyl radical also oxidizes to a carboxyl radical during the reaction, as for instance, the conversion of p-methylbenzyl acetate to terephthalic acid in the oxidation of p-xylene.

A variety of benzylic alcohols and ethers are suitable for activating the oxidation reaction as exemplified by p-methylbenzyl alcohol, p-xylylene glycol, 3,5-dimethylbenzyl alcohol, 5-methyl-m-xylylene glycol, di-p-methylbenzyl ether and p-methylbenzyl-ethyl ether. The benzylic alcohols are probably often esterified under typical reaction conditions to form the corresponding benzylic acetates, etc., when a substantial concentration of acetic acid or another fatty acid is present in the reaction mixture.

The aforesaid benzylic activators may contain other nuclear substituents in the form of any atom or radical that does not enter into or interfere with the desired oxidation reaction, as exemplified by halogens and nitro, phenyl, carboxy, alkoxy and acyl radicals. P-chlorobenzyl acetate is one example of a suitable promoter of this nature. Suitable concentrations of the activating benzylic compounds are described hereinafter.

Certain embodiments of the present invention are similar to the reactions described in Brill Pat. No. 2,835,514 and Ardis et al. Pat. No. 3,036,122 except for the use of benzylic compounds as the promoter. Accordingly, those patents are incorporated herein by reference as indicative of suitable reaction materials and conditions unless otherwise specified herein.

The process of this invention is advantageous for the oxidation of aromatic compounds having one or more methyl groups attached to the aromatic nucleus, and the result is the efficient production of the desired aromatic carboxylic acid in a relatively short time by conversion of these nuclear methyl radicals into carboxyl groups. Typical starting materials are methyl-substituted benzenes such as toluene, m-xylene, p-xylene, or mixtures containing such compounds. However, a wide variety of other methylated aromatic compounds may be employed, as exemplified by o-xylene, mesitylene (1,3,5-trimethyl benzene), durene (1,2,4,5-tetramethyl benzene) and 4,4'-bitoyl. In addition, the methyl-aromatic starting material may contain other nuclear substituents which are inert to the oxidation reaction conditions, such as chlorine, bromine, fluorine, nitro, carboxyl, alkoxy, aryloxy, or tertiary alkyl groups. A few examples of the many possible conversions include toluene to benzoic acid, m-xylene or m-toluic acid to isophthalic acid, p-xylene or p-toluic acid to terephthalic acid, 1,4-dimethyl-2-chlorobenzene to chloroterephthalic acid, and 1,4-dimethyl-2-nitrobenzene to nitroterephthalic acid.

In these liquid phase reactions, the oxidation catalyst is generally in solution and it is often desirable to dilute the alkyl aromatic compound that is to be oxidized; therefore, a reaction solvent is usually employed. Lower aliphatic monocarboxylic acids containing from 2 to 4 carbon atoms are particularly suitable for the purpose. For example, this liquid reaction medium may be acetic, propionic or butyric acid or a mixture of two or more of these. In the oxdation of p-xylene, acetic acid is the preferred solvent. For rapid and efficient oxidation, water is desirably present in the charge mixture in a minor amount ranging from 0.4 to 10% of the total weight of the reaction mixture even though water is formed in the course of the reaction; and water of crystallization in a metal salt catalyst and the normal water content of a commercial fatty acid may introduce a sufficient quantity for the purpose. In the case of some oxidation catalysts, for example cobalt (II) acetate, about 0.4% of water appear to be necessary for dissolving an adequate amount of catalyst. Excessive amounts of water are usually undesirable in tending to slow the reaction rate and may also result in a product of lower purity.

In general, the concentration of the methyl-substituted aromatic reactant may range from about 2 to about 35% of the total weight of the reaction mixture, but a concentration within the range of about 5 to 30% is usually preferred. While it is often desirable to maintain a high concentration of reactant material in the charge mixture for maximum production efficiency, other factors may govern the maximum concentration where the product is precipitated as a solid under reaction conditions, as in the case of terephthalic acid and most other aromatic carboxylic acids. In large scale operations, it is usually preferable that the resultant slurry should be of pumpable consistency which is of the order of about a 35% maximum for terephthalic acid; hence this factor can impose a limit upon the charge concentrations of the reactant and any benzylic activating compound which is also converted into a solid product.

Methylenic ketones or diketones containing a methylene group adjacent to the carbonyl radical are known activators for these oxidation reactions, as exemplified by methyl ethyl ketone, methyl n-propyl ketone, diethyl ketone, 2,4-pentanedione and 2,5-hexanedione. In the present process, one or more of these ketonic substances may often be employed advantageously as a secondary promoter in conjunction with the aforesaid benzylic compounds to improve yields and/or reduce the induction period in the case of batch reactions. While it is contemplated that these ketones may be charged in conventional activating proportions, it is often desirable in the present process to use such supplementary activators in smaller proportions which would not provide any significant activation of the reaction in the absence of the benzylic compound. Accordingly, methyl ethyl ketone or another of these ketones may be present in amounts of from about 0.01 to 0.50 mol per mol of the alkyl aromatic compound undergoing oxidation, but a quantity in the range of about 0.02 to 0.10 mol of ketone is usually employed. Methyl ethyl ketone is preferred for the purpose, especially in oxidizing p-xylene, and it is converted into acetic acid during the reaction.

The amount of activating benzylic compound in the charge may range from about 0.1 to 5.0 mols per mol of alkyl aromatic compound, but quantities in the range of about 0.3 to 0.6 mol are usually preferred. In using molar ratios of this activator below about 0.3:1, it is often desirable to add a supplementary ketone promoter; and there are indications that molar ratios above about 1:1 produce no advantages sufficient to compensate for the extra cost of the benzylic activating material. In the production of terephthalic acid, excellent results are obtainable with a reaction mixture containing between about 0.3 and 0.6 mol of p-xylene diacetate and between about 0.02 and 0.10 mol of methyl ethyl ketone per mol of p-xylene charged.

Suitable oxidation catalysts for this process include one or more of the well known heavy metal compound catalysts, especially the salts thereof, which are soluble in the aforesaid reaction mixtures. These include such metals as cobalt, manganese, chromium, cerium, iron and nickel which may be conveniently employed in the form of their organic acid salts. Cobalt salts are the preferred catalysts, especially those derived from aliphatic monocarboxylic acids containing from 2 to 4 carbon atoms, as exemplified by cobalt propionate, cobalt butyrate and particularly cobalt (II) acetate tetrahydrate. The concentration of the catalyst may range from about 0.01 to 2 or more mols per liter of total solution charged and a quantity between about 0.05 and 0.5 mol is often preferred in the case of a cobalt compound. Excessive amounts of the catalyst are wasteful and they increase the difficulty of purifying the product.

The oxidation is effected in a closed vessel by contacting the charge or reaction mixture with a gas containing molecular oxygen, that is a gas containing free oxygen (not combined with other elements) as exemplified by air, air enriched with oxygen or preferably gaseous oxygen of commercial purity. The oxygen partial pressure in the reactor may range from about 5 to 5000 pounds per square inch (p.s.i.) and a partial pressure between about 200 and 700 p.s.i. is usually preferred. Within these ranges, lower pressures may be utilized to moderate the reaction, if that should prove necessary, or higher pressures can be used to speed up the reaction. The reaction temperature may range from about 20 to 180° C. depending upon the particular alkylated aromatic compound being oxidized and the desired reaction rate; however, it is generally maintained in the range of about 80 to 145° C. In the case of p-xylene oxidation, the temperature is usually held constant between about 100 and 145° C., and the optimum results appear to be obtained in the range between 120 and 140° C. The instant method is suitable for both batch processing and the continuous operations that are generally preferred in industry.

For a better understanding of the nature and objects of this invention, reference should be had to the following examples in which all proportions are set forth in terms of weight and all temperatures as degrees centigrade (° C.) unless otherwise stated. Unless otherwise indicated, the same reaction conditions and quantities of materials in the charge are employed in all examples. Comparative examples are designated by letters whereas numerals are employed for examples which illustrate the present invention but are not intended to limit the scope thereof.

Comparative Example A.—Para-xylene is subjected to catalytic oxidation by heating the following charge mixture to 130° C. in an oxygen atmosphere in a closed autoclave.

p-Xylene—0.300 gram mol
Cobalt acetate tetrahydrate—0.030 gram mol
Glacial acetic acid—300 cc.

The solution which has an initial water content of approximately 0.7% by weight is stirred continuously and rapidly. The vessel is cooled with water to maintain the reaction temperature at 130° and additional oxygen is introduced to maintain the initial 250 p.s.i.g. pressure. After the consumption of oxygen ceases, the reaction mixture is cooled and removed from the autoclave. The resulting slurry is heated to a temperature of approximately 100° C. before filtering to separate the white solid particles which are subjected to washing with hot acetic acid followed by hot water and then dried in an oven at 105° C. The yield of solid terephthalic acid amounts to only 38% by weight, and the slurry filtrate is found to contain a larger yield of para-toluic acid.

Comparative Example B.—The procedure of Comparative Example A is duplicated with 0.10 mol of methyl ethyl ketone added to the charge mixture as an activator, and the induction period is observed to be 28 minutes. Terephthalic acid with a content of 2.85% p-carboxybenzaldehyde by weight is recovered in an 87% yield based on p-xylene alone.

Comparative Example C.—Comparative Example A is again repeated with less methyl ethyl ketone than Example B in a charge composed of:

p-Xylene—0.300 mol
Methyl ethyl ketone—0.015 mol
Cobalt acetate tetrahydrate—0.030 mol
Glacial acetic acid—300 cc.

The induction period is 72 minutes and the yield of terephthalic acid is 43% on the basis of the p-xylene charged.

Comparative Example D.—The procedure of Comparative Example C is repeated under the same conditions with a charge differing only in that the content of p-xylene is decreased to 0.200 mol, thereby increasing the molar ratio of ketone activator to xylene. The induction period is 60 minutes, and the yield of terephthalic acid is found to be 39%.

The foregoing examples demonstrate that in the absence of a reaction activator, the cobalt-catalyzed oxidation of p-xylene to terephthalic acid in a single stage results in unsatisfactory yields accompanied by greater production of partially oxidized material. Also, it is apparent that methyl ethyl ketone in adequate concentration is a good activator, but that smaller amounts of the ketone produce no significant improvement in yield.

Example 1.—In demonstrating the influence of p-xylylene diacetate, the procedure of Comparative Example A is repeated in all respects with the following charge mixture:

p-Xylene—0.200 mol
p-Xylylene diacetate—0.100 mol
Cobalt acetate tetrahydrate—0.030 mol
Glacial acetic acid—300 cc.

The initial water content of this reaction mixture is approximately 0.7% by weight. The induction period is observed to be 66 minutes. Substantial conversion of the diacetate activator to terephthalic acid occurs during reaction; for upon analyzing the white solid reaction product, the yield of terephthalic acid is determined to be 105% based on the p-xylene alone, or a 70% yield on the basis of the combined content of p-xylene and p-xylylene diacetate content of the charge. This product has a p-carboxybenzaldehyde content of 2.15% by weight which is a substantial reduction from the amount of this undesired by-product obtained in Comparative Example B. In addition to the marked improvement in yield, the p-xylylene diacetate activator has the desirable quality of being converted into the desired terephthalic acid product rather than the far less valuable acetic acid by-product obtained with the methyl ethyl ketone activator.

Example 2.—The same procedure is followed in reacting the following mixture which contains methyl ethyl ketone as well as the diacetate activator.

p-Xylene—0.200 mol
p-Xylylene diacetate—0.100 mol
Methyl ethyl ketone—0.015 mol
Cobalt acetate tetrahydrate—0.030 mol
Glacial acetic acid—300 cc.

The induction period of this batch reaction is found to be 39 minutes, a shorter period than that of Example 1. The p-carboxybenzaldehyde content of the product is 1.75% which is better than the result obtained in Example 1 and a marked improvement over Comparative Example B. The yield of terephthalic acid is found to be 130.5% on the basis of the p-xylene charge alone or 87% when based on both the p-xylene and the xylylene diacetate. It is noteworthy that these improvements in yield and purity over the results in Example 1 are obtainable with the same small addition of methyl ethyl ketone that produces no significant activating effect as the sole activator in Comparative Examples C and D.

Example 3.—Example 2 is repeated with a charge in which the methyl ethyl ketone content is reduced to 0.005 mol. In comparison with Example 1, with 47 minute induction period is shorter and the yield of terephthalic acid is raised to 120% based on the p-xylene alone or 80% on the basis of both the p-xylene and diacetate. Thus, in combination, a very small proportion of the methyl ethyl ketone enhances the effect of the primary activators of the present invention, even though somewhat larger amounts of the ketone are ineffective as the sole activating agent in the reactions in Comparative Examples C and D.

Example 4.—Example 1 is repeated with the following charge containing an increased proportion of the diacetate as the ony activator.

p-Xylene—0.200 mol
p-Xylylene diacetate—0.150 mol
Cobalt acetate tetrahydrate—0.030 mol
Glacial acetic acid—300 cc.

The yield of terephthalic acid amounts to 111% on a basis of p-xylene alone or 74% when based on both the xylene and the diacetate. From this modest improvement in yield over Example 1 as well as other indications, it appears that the most pronounced effect of p-xylylene diacetate as the sole activator is realized with ratios of about 0.3 to 0.6 mol of this activating agent per mol of the p-xylene.

Example 5.—Example 2 is repeated with a charge in which the 0.100 mol p-xylylene diacetate activator is replaced with 0.100 mol p-xylylene glycol. The induction period of 19 minutes is shorter than in any other example and the terephthalic acid yield of 80% based on the p-xylene alone, or 53% on the basis of both xylene and glycol charged, is a substantial improvement over that of Comparative Examples C and D.

The instant invention is described hereinbefore in a limited number of embodiments under substantially the same conditions to facilitate comparison of results and the reaction conditions are set forth in full detail to provide complete illustration. However, it will be appreciated by those skilled in the art that this invention is not confined to such embodiments and details and that many other variations and modifications are included within its purview. Accordingly, the present invention should not be construed as restricted in any particulars except as may be set forth in the appended claims or required by the prior art.

We claim:
1. In a process for the single stage catalytic oxidation with molecular oxygen of p-xylene in a lower aliphatic monocarboxylic acid reaction solvent containing a dissolved cobalt compound as an oxidation catalyst to produce terephthalic acid; the improvement which comprises activating the oxidation reaction mixture by incorporating a reaction activating quantity of p-xylylene diacetate.

2. A process according to claim 1 in which a methylenic ketone is also incorporated in said reaction mixture.

3. A process according to claim 1 in which methyl ethyl ketone is also incorporated in said reaction mixture.

4. A process according to claim 1 in which said liquid reaction mixture includes a substantial amount of an aliphatic monocarboxylic acid containing from 2 to 4 carbon atoms.

5. A process according to claim 1 in which said reaction mixture contains at least 0.01 mol of a methylenic ketone per mol of xylene.

6. A process according to claim 1 in which said reaction mixture contains between about 0.3 and 0.6 mol of said diacetate per mol of p-xylene.

7. A process according to claim 6 in which said reaction mixture contains a sufficient amount of a methylenic ketone to enhance activation of the mixture.

8. A process according to claim 1 in which said reaction mixture contains between about 0.3 and 0.6 mol of said diacetate and at least 0.02 mol of methyl ethyl ketone per mol of p-xylene.

References Cited
UNITED STATES PATENTS 2,853,514   9/1958   Brill _____ 260—524

FOREIGN PATENTS 841,053   7/1960   Great Britain _____ 260—524

LORRAINE A. WEINBERGER, Primary Examiner

R. S. WEISSBERG, Assistant Examiner

PO-1050
(5/69)

UNITED STATES PATENT OFFICE
CERTIFICATE OF CORRECTION

Patent No. 3,649,681          Dated    March 14, 1972

Inventor(s) Byron E. Johnston and Peter R. Taussig

It is certified that error appears in the above-identified patent and that said Letters Patent are hereby corrected as shown below:

Column 3, line 10, change "low" to --lower--

Column 3, line 16, change "byproduct" to --by-product--

Column 4, line 20, change "ranging from 0.4" to --ranging from about 0.4--

Column 4, line 27, change "appear" to --appears--

Signed and sealed this 12th day of September 1972.

(SEAL)
Attest:

EDWARD M. FLETCHER, JR.
Attesting Officer

ROBERT GOTTSCHALK
Commissioner of Patents